US011149955B2

(12) United States Patent
Quimby

(10) Patent No.: US 11,149,955 B2
(45) Date of Patent: Oct. 19, 2021

(54) MODULAR FORCED AIR BURNER ASSEMBLY

(71) Applicant: Casey Quimby, Vidalia, LA (US)

(72) Inventor: Casey Quimby, Vidalia, LA (US)

( * ) Notice: Subject to any disclaimer, the term of this patent is extended or adjusted under 35 U.S.C. 154(b) by 261 days.

(21) Appl. No.: 16/398,911

(22) Filed: Apr. 30, 2019

(65) Prior Publication Data

US 2020/0348028 A1    Nov. 5, 2020

(51) Int. Cl.
*F23L 5/02* (2006.01)
*F23M 9/04* (2006.01)
*F24C 3/02* (2006.01)
*F24C 15/32* (2006.01)
*F23D 14/70* (2006.01)

(52) U.S. Cl.
CPC ............ *F24C 3/02* (2013.01); *F23D 14/70* (2013.01); *F24C 15/322* (2013.01); *A47J 2201/00* (2013.01); *F23L 5/02* (2013.01); *F23M 9/04* (2013.01)

(58) Field of Classification Search
CPC ........ F23D 14/04; F23D 14/045; F23D 14/24; F23D 14/48; F23D 14/70; F23D 11/001; F23D 11/36; F23D 11/38; F23D 11/40; F23C 3/02; F23C 3/022; F23C 3/025; F23C 3/027; F23C 15/322; F23C 5/02; F23C 7/008; A47J 37/00; A47J 37/0647; A47J 37/0754; A47J 36/26; A47J 2201/00; F27B 14/00; F16C 7/00; B23Q 1/03; E05Y 2201/686; E04D 2001/3411; F24B 1/1888
USPC ........................................................ 126/1 R
See application file for complete search history.

(56) References Cited

U.S. PATENT DOCUMENTS 2,331,931 A * 10/1943 Robinson .................. F24C 5/20
126/38
2,560,364 A * 7/1951 Nemeth .................. F23C 99/00
431/263
(Continued)

FOREIGN PATENT DOCUMENTS

CN 110454816 A * 11/2019
WO WO-9932022 A1 * 7/1999 .............. A47J 36/36

OTHER PUBLICATIONS

Oliver II, Lionel, "Blown air burners, aka "Forced air" burners for propane and natural gas," Jun. 28, 2014, BackyardMetalcasting. com, timestamp retrieved from Jul. 24, 2014 (Year: 2014).*
(Continued)

*Primary Examiner* — Steven B McAllister
*Assistant Examiner* — Mark P Yost

(57) ABSTRACT

A modular forced air burner assembly for rapidly heating contents of an oversized pot includes a frame, which has a top that is substantially open and configured to support a pot. A burner assembly that is selectively positionable below the pot is configured to burn a fuel gas to heat the pot and its contents. A forced air module that is selectively operationally couplable to the burner assembly is configured to force air into the burner assembly to enhance combustion of the fuel gas. A pipe is selectively couplable to an exterior of the frame so that the pipe extends from proximate to a midpoint of the frame past the top of the frame. The pipe is configured to direct heat across a sidewall of the pot to enhance heating of the pot and its contents.

18 Claims, 4 Drawing Sheets

(56) References Cited

U.S. PATENT DOCUMENTS

| | | | | |
|---|---|---|---|---|
| 3,153,410 A * | 10/1964 | Goodare | F27B 17/02 | 126/343.5 R |
| 3,279,452 A | 10/1966 | Hottenroth | | |
| 3,327,698 A | 6/1967 | Leslie | | |
| 3,384,067 A | 5/1968 | Rawald | | |
| 3,943,910 A * | 3/1976 | White | A47J 37/044 | 126/41 R |
| 3,995,991 A * | 12/1976 | Wilkinson | F24H 3/0488 | 432/222 |
| 4,268,248 A * | 5/1981 | Wilbur | F24H 3/0488 | 432/62 |
| 4,471,751 A | 9/1984 | Hottenroth | | |
| 4,640,680 A | 2/1987 | Schilling | | |
| 4,653,462 A * | 3/1987 | DeFoe | F24C 15/36 | 126/24 |
| 4,722,322 A * | 2/1988 | Varney | F24C 1/16 | 126/15 R |
| 4,726,350 A * | 2/1988 | Steinhauser | F24C 3/14 | 126/38 |
| 4,927,356 A * | 5/1990 | Otsuka | F23D 14/105 | 431/351 |
| 5,065,735 A * | 11/1991 | Bourgeois | F24C 15/10 | 126/40 |
| 5,117,808 A * | 6/1992 | Peters | F24C 3/14 | 126/25 R |
| 5,979,428 A * | 11/1999 | Greene, Jr. | F24C 15/28 | 126/38 |
| 6,102,027 A * | 8/2000 | Tilby | F24C 3/14 | 126/38 |
| 6,223,738 B1 * | 5/2001 | Wu | F24C 3/103 | 126/38 |
| 7,591,648 B2 * | 9/2009 | Mosiewicz | F23D 14/62 | 431/351 |
| 7,640,848 B1 * | 1/2010 | Bourgeois | A47J 36/26 | 99/340 |
| 7,770,514 B1 * | 8/2010 | Bourgeois | A47J 37/0763 | 99/403 |
| 7,775,203 B1 * | 8/2010 | Patrick | F24C 3/14 | 126/38 |
| 8,887,626 B2 * | 11/2014 | Baker, Jr. | A47J 36/165 | 99/323.5 |
| 9,504,357 B2 * | 11/2016 | Cheng | A47J 36/34 | |
| 10,054,310 B2 * | 8/2018 | Lirette | F24C 3/08 | |
| 10,837,648 B1 * | 11/2020 | Lapeyre | F24C 3/14 | |
| 2016/0223196 A1 * | 8/2016 | Tuttle | F23D 11/24 | |

OTHER PUBLICATIONS

Machine Translation of Jiaolong (Year: 2019).*

* cited by examiner

MODULAR FORCED AIR BURNER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to burner assemblies and more particularly pertains to a new burner assembly for rapidly heating contents of an oversized pot.

BRIEF SUMMARY OF THE INVENTION

An embodiment of the disclosure meets the needs presented above by generally comprising a frame, which has a top is substantially open and configured to support a pot. A burner assembly that is selectively positionable below the pot is configured to burn a fuel gas to heat the pot and its contents. A forced air module that is selectively operationally couplable to the burner assembly is configured to force air into the burner assembly to enhance combustion of the fuel gas. A pipe is selectively couplable to an exterior of the frame so that the pipe extends from proximate to a midpoint of the frame past the top of the frame. The pipe is configured to direct heat across a sidewall of the pot to enhance heating of the pot and its contents.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
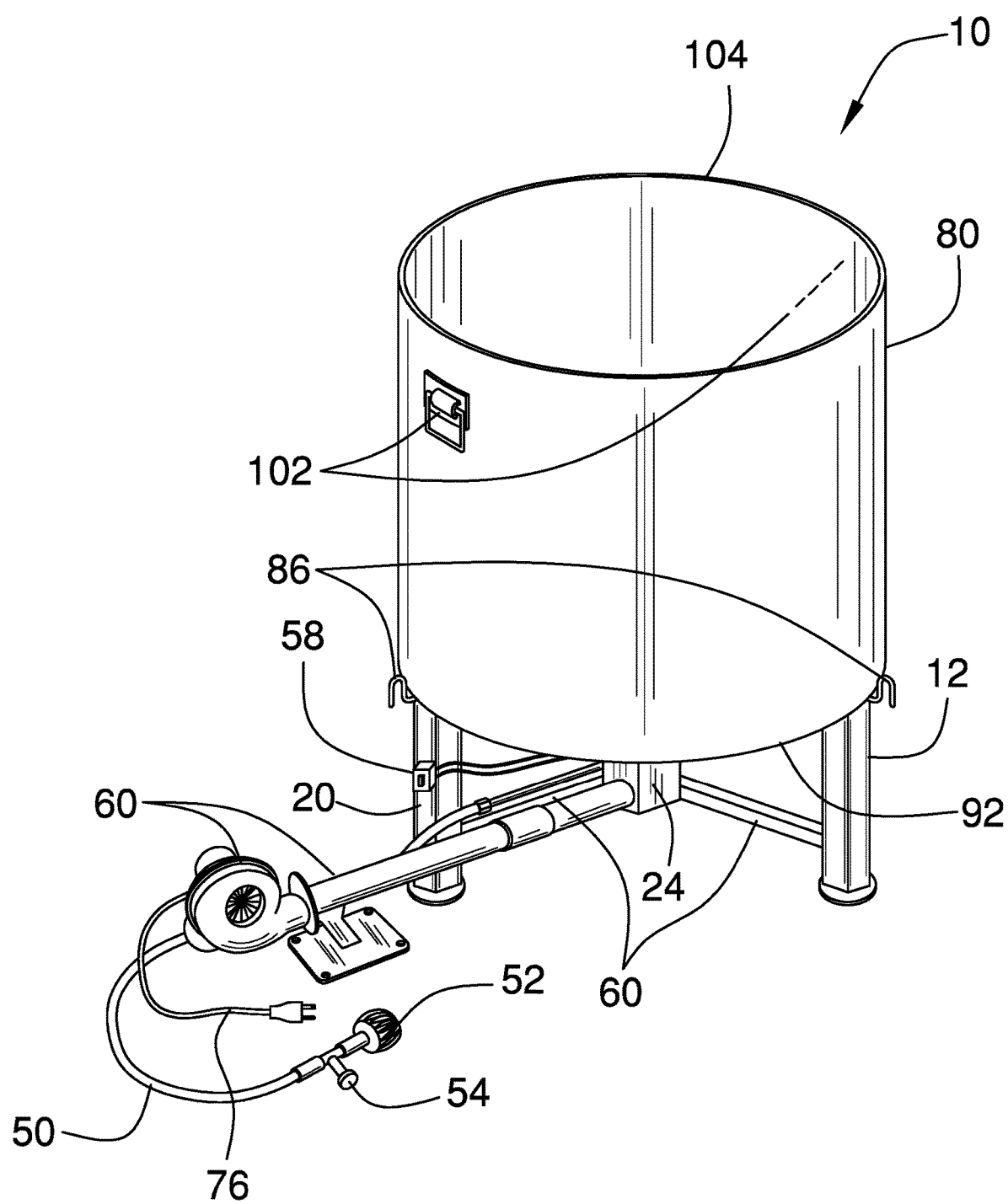
FIG. 1 is an isometric perspective view of a modular forced air burner assembly according to an embodiment of the disclosure.

With reference now to the drawings, and in particular to FIGS. 1 through 4 thereof, a new burner assembly embodying the principles and concepts of an embodiment of the disclosure and generally designated by the reference numeral 10 will be described.

As best illustrated in FIGS. 1 through 4, the modular forced air burner assembly 10 generally comprises a frame 12, which has a top 14 is substantially open and configured to support a pot. The frame 12 comprises a plurality of legs 16 and a plurality of crossbars 18. Each crossbar 18 is coupled to and extends between upper ends 20 of a respective pair of adjacently positioned legs 22 so that the legs 16 of the respective pair of adjacently positioned legs 22 are positioned in parallel. The plurality of legs 16 comprises three legs 16 so that the frame 12 is triangularly shaped when viewed from the top 14.

A burner assembly 24 that is selectively positionable below the pot is configured to burn a fuel gas to heat the pot and its contents. The burner assembly 24 comprises a housing 26 that defines an interior space 28. The housing 26 has an upper face 30 that is open.

A panel 32, which is V-shaped, is coupled to the housing 26 and is positioned in the interior space 28. The panel 32 has an upper limit 34 that is coupled to opposing sides 36 of the housing 26 proximate to the upper face 30. A plurality of holes 38 is positioned in the panel 32.

A first tube 40 is coupled to and extends from the housing 26 so that the first tube 40 is in fluidic communication with the interior space 28. The first tube 40 extends from proximate to a lower face 42 of the housing 26. A second tube 44 is coupled to the first tube 40 distal from the housing 26. The second tube 44 is circumferentially larger than the first tube 40.

Figure 3:
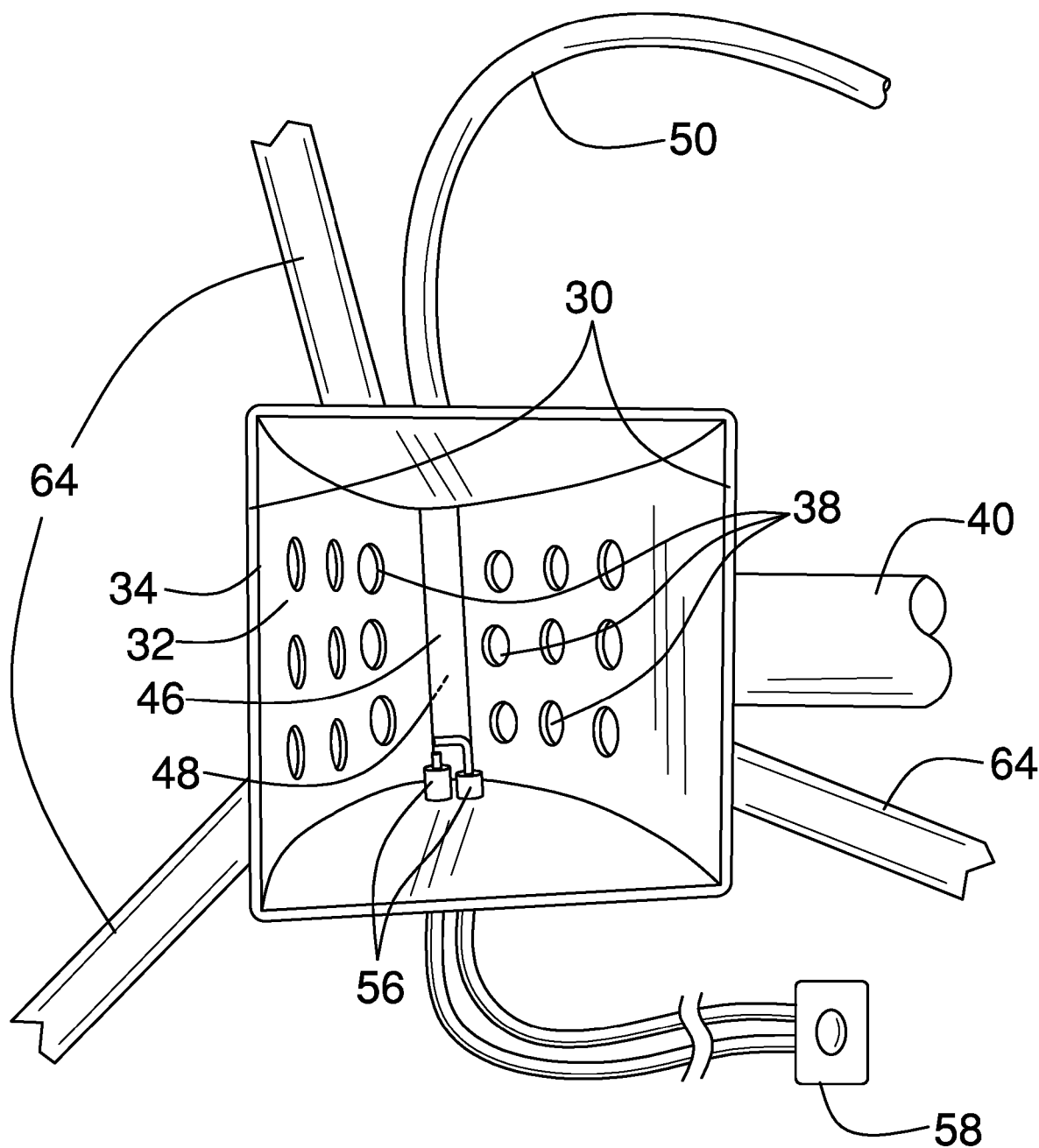
FIG. 3 is a top view of a burner assembly of an embodiment of the disclosure.
Figure 4:
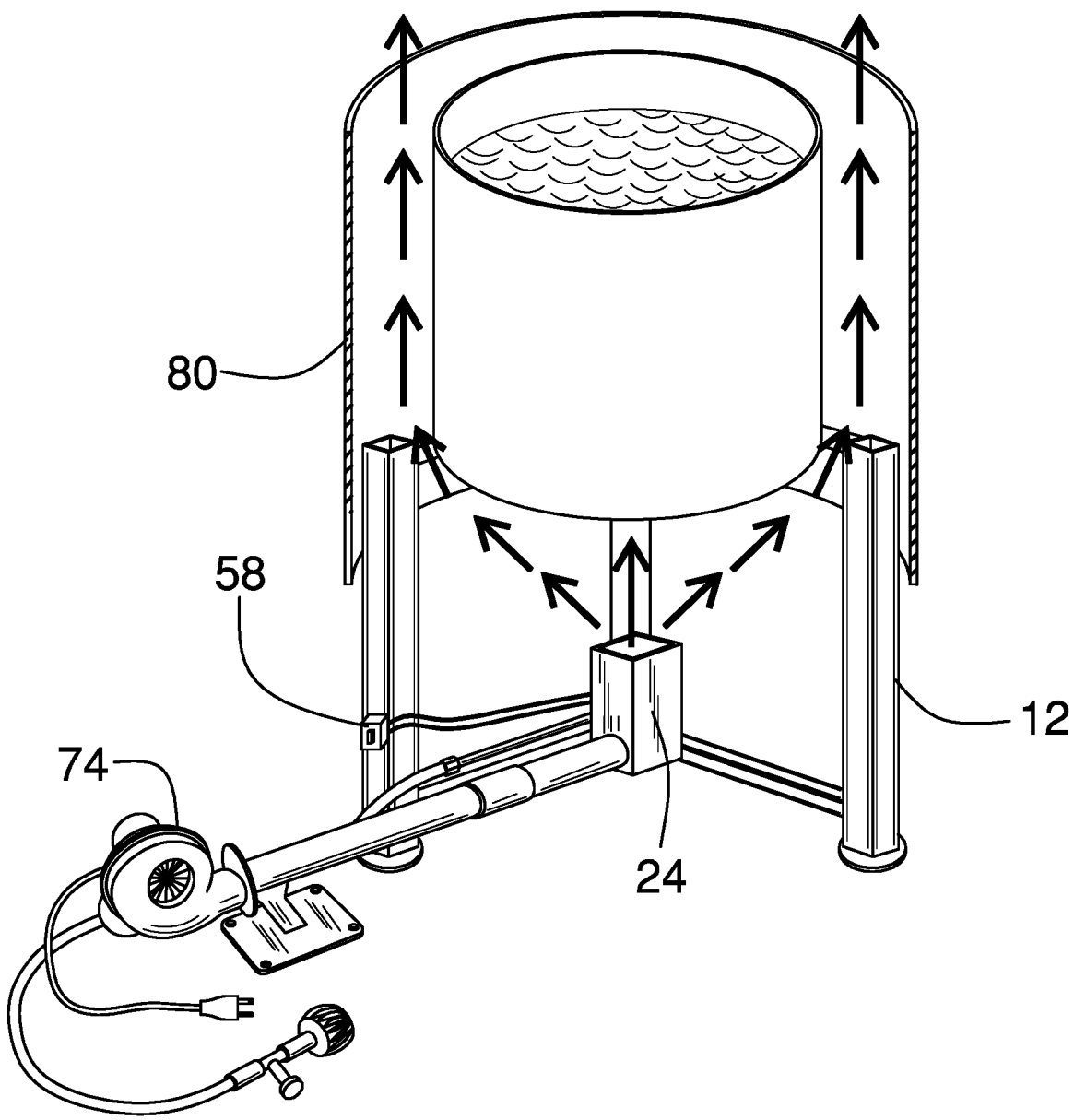
FIG. 4 is an in-use view of an embodiment of the disclosure.

A burner 46 is coupled to the housing 26 and is positioned in the interior space 28 so that the burner 46 is positioned above a lower limit 48 of the panel 32, as shown in FIG. 3. A hose 50 is coupled to the burner 46 and extends from the housing 26. A connector 52 is coupled to the hose 50 distal from the housing 26. The connector 52 is configured to couple the hose 50 to a source of compressed fuel gas, such as a propane tank or the like. A valve 54 is positioned in the hose 50 proximate to the connector 52 so that the valve 54 is configured to selectively close the hose 50.

An igniter 56 is coupled to the housing 26 and is positioned in the interior space 28 proximate to the burner 46, as shown in FIG. 3. A switch 58, which is selectively couplable to the frame 12, is selectively operationally couplable to the igniter 56 so that the switch 58 is positioned to selectively actuate the igniter 56 to light the fuel gas that escapes from the burner 46.

Figure 2:
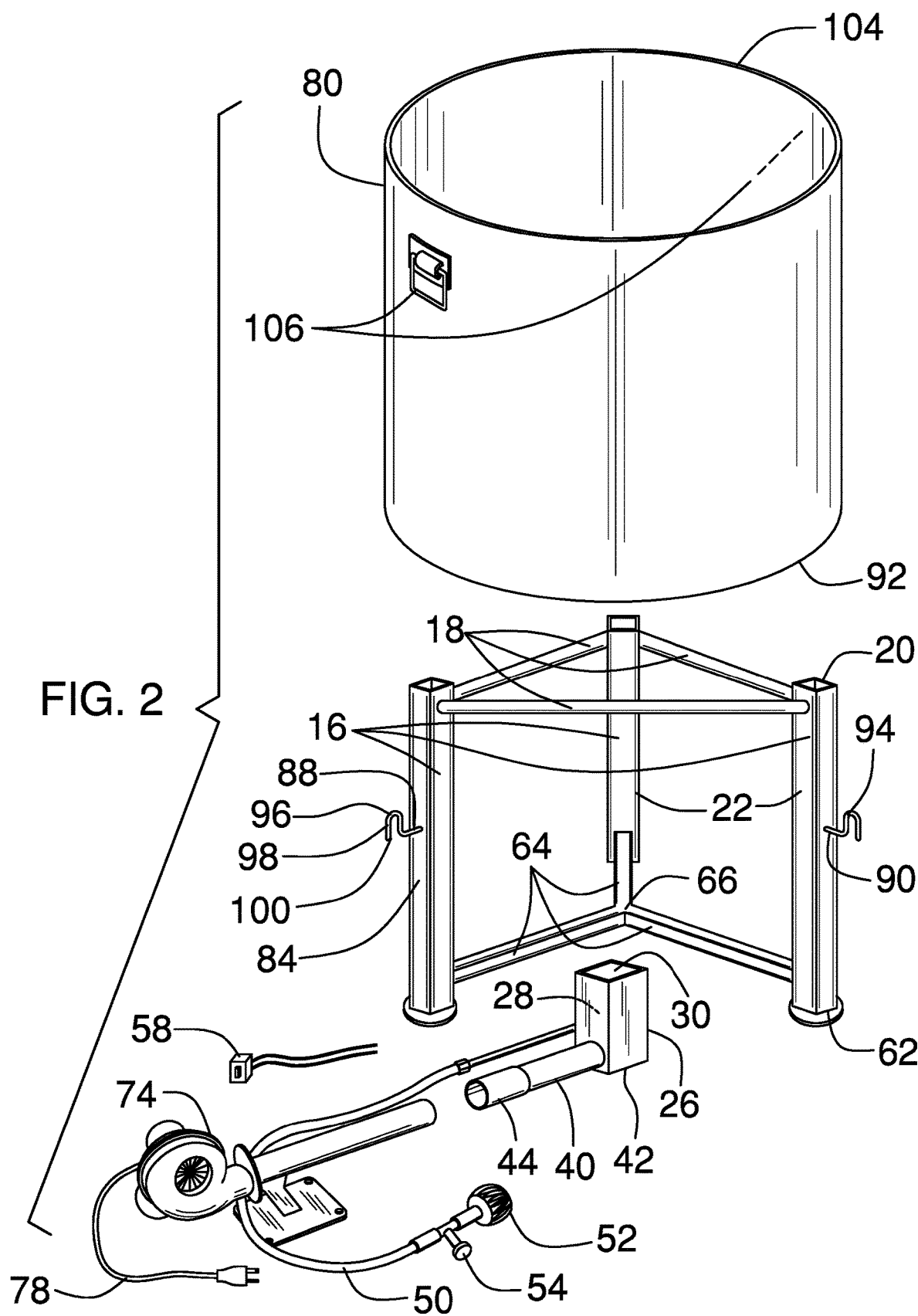
FIG. 2 is an exploded view of an embodiment of the disclosure.

A brace 60 is coupled to and extends between the legs 16 of the plurality of legs 16, as shown in FIG. 2. The brace 60 is positioned proximate to a lower end 62 of each leg 16 so that the brace 60 is positioned to rigidify the frame 12 and to position the burner assembly 24 so that the burner assembly 24 is positioned to heat the pot and its contents. The brace 60 comprises a set of bars 64 that are mutually coupled to define a centerpoint 66 of the brace 60. Each bar 64 extends to and is coupled to a respective leg 16.

A forced air module 68 that is selectively operationally couplable to the burner assembly 24 is configured to force air into the burner assembly 24 to enhance combustion of the fuel gas. The forced air module 68 comprises a third tube 70 that is selectively couplable to the first tube 40 to fluidically couple the third tube 70 to the interior space 28. The third tube 70 is circumferentially equivalent to the first tube 40 so that the third tube 70 is positioned to be inserted into the second tube 44 to fluidically couple the third tube 70 to the interior space 28.

A stand 72 is coupled to the third tube 70 distal from the first tube 40. The stand 72 is configured to position on a substantially horizontal surface so that the third tube 70 is substantially parallel to the substantially horizontal surface.

A blower 74 is coupled to the third tube 70 distal from the first tube 40. The blower 74 is configured to force air into the burner assembly 24 to enhance combustion of the fuel gas. A power module 76 is operationally coupled to the blower 74 so that the power module 76 is positioned to power the blower 74. The power module 76 comprises a power cord 78 that is configured to couple to a source of electrical current to power the blower 74.

A pipe 80 is selectively couplable to an exterior 82 of the frame 12 so that the pipe 80 extends from proximate to a midpoint 84 of the frame 12 past the top 14 of the frame 12. The pipe 80 is configured to direct heat across a sidewall of the pot to enhance heating of the pot and its contents. The enhanced heating of the pot shortens cooking times when using oversized pots, for example, by bringing water to a boil in a shorter period of time for cooking shellfish such as crawfish, lobsters, and the like. As the frame 12, the burner assembly 24, the blower 74 assembly, and the pipe 80 are separable, the assembly 10 is highly modular and can be readily transported and set up for use at a desired location.

A plurality of couplers 86 is coupled to the frame 12 so that the couplers 86 are positioned to selectively couple to the pipe 80 to removably couple the pipe 80 to the frame 12. Each coupler 86 comprises a first rod 88 that is coupled to and extends from the frame 12. The first rod 88 is L-shaped so that a horizontal segment 90 of the first rod 88 is positioned to contact a lower perimeter 92 of the pipe 80 as the pipe 80 is lowered onto the frame 12 and so that a vertical segment 94 of the first rod 88 is positioned to abut the pipe 80 to retain the pipe 80 on the horizontal segment 90.

A second rod 96 is coupled to and extends arcuately from the first rod 88 distal from the frame 12. A third rod 98 is coupled to and extends from the second rod 96 distal from the first rod 88 so that the third rod 98 is substantially parallel to the vertical segment 94 of the first rod 88. The third rod 98, the second rod 96, and the vertical segment 94 of the first rod 88 define a hook 100 that is configured to couple to a chain to lift the frame 12.

A pair of handles 102 is coupled to the pipe 80 proximate to an upper perimeter 104 of the pipe 80 so that the handles 102 are opposingly positioned on the pipe 80. Each handle 102 is configured to be grasped in a respective hand of a user to lift the pipe 80. The pair of handles 102 comprises a pair of rings 106. The rings 106 are rectangularly shaped and are pivotally coupled to the pipe 80.

In use, the frame 12 is positioned in the desired location. The pipe 80 is positioned on the first rod 88s and the burner assembly 24, with the igniter 56 attached, is positioned on the brace 60. The forced air module 68 is connected to the burner assembly 24 and the burner assembly 24 is connected to the propane tank using the connector 52. The pot is positioned on the top 14 of the frame 12 and contents are added. With the fuel gas flowing through the hose 50 to the burner 46, the igniter 56 is actuated using the switch 58.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A modular forced air burner assembly comprising:
   a frame having a top configured for supporting a pot, the top being open;
   a burner assembly selectively positionable below the pot positioned on the top of the frame wherein the burner assembly is configured for burning a fuel gas for heating the pot and its contents;
   a forced air module selectively operationally couplable to the burner assembly wherein the forced air module is configured for forcing air into the burner assembly for enhancing combustion of the fuel gas;
   a pipe selectively couplable to an exterior of the frame such that the pipe extends from a point proximate to a midpoint of the frame past the top of the frame wherein the pipe is configured for directing heat across a sidewall of the pot for enhancing heating of the pot and its contents;
   the burner assembly comprising:
      a housing defining an interior space, the housing having an upper face, the upper face being open;
      a panel coupled to the housing and positioned in the interior space, the panel being V-shaped, the panel having an upper limit coupled to opposing sides of the housing proximate to the upper face;
      a plurality of holes positioned in the panel;

a first tube coupled to and extending from the housing such that the first tube is in fluidic communication with the interior space, the first tube extending from a point proximate to a lower face of the housing;

a burner coupled to the housing and positioned in the interior space such that the burner is positioned above a lower limit of the panel;

a hose coupled to the burner and extending from the housing; and a connector coupled to the hose distal from the housing wherein the connector is configured for coupling the hose to a source of compressed fuel gas; and the forced air module comprising:

a third tube selectively couplable to the first tube for fluidically coupling the third tube to the interior space;

a stand coupled to the third tube distal from the first tube wherein the stand is configured for positioning on a horizontal surface such that the third tube is parallel to the horizontal surface; and a blower coupled to the third tube distal from the first tube wherein the blower is configured for forcing air into the burner assembly for enhancing combustion of the fuel gas.

2. The assembly of claim 1, further including the frame comprising a plurality of legs and a plurality of crossbars, each crossbar being coupled to and extending between upper ends of a respective pair of adjacently positioned legs such that the legs of the respective pair of adjacently positioned legs are positioned in parallel.

3. The assembly of claim 2, further including the plurality of legs comprising three legs such that the frame is triangularly shaped when viewed from the top.

4. The assembly of claim 1, further including the connector being configured for coupling to a propane tank.

5. The assembly of claim 1, further including a valve positioned in the hose proximate to the connector such that the valve is configured for selectively closing the hose.

6. The assembly of claim 1, further comprising:

an igniter coupled to the housing and positioned in the interior space proximate to the burner, and a switch selectively couplable to the frame, the switch being selectively operationally couplable to the igniter such that the switch is positioned for selectively actuating the igniter for lighting the fuel gas escaping from the burner.

7. The assembly of claim 2, further including a brace coupled to and extending between the legs of the plurality of legs, the brace being positioned proximate to a lower end of each leg such that the brace is positioned for rigidifying the frame and for positioning the burner assembly such that the burner assembly is positioned for heating the pot and its contents.

8. The assembly of claim 7, further including the brace comprising a set of bars, the bars being mutually coupled defining a centerpoint of the brace, each bar extending to and being coupled to a respective leg.

9. The assembly of claim 1, further comprising:

a second tube coupled to the first tube distal from the housing, the second tube being circumferentially larger than the first tube; and the third tube being circumferentially equivalent to the first tube such that the third tube is positioned for inserting into the second tube for fluidically coupling the third tube to the interior space.

10. The assembly of claim 1, further including a power module operationally coupled to the blower such that the power module is positioned for powering the blower.

11. The assembly of claim 10, further including the power module comprising a power cord wherein the power cord is configured for coupling to a source of electrical current for powering the blower.

12. The assembly of claim 1, further including a plurality of couplers coupled to the frame such that the couplers are positioned for selectively coupling to the pipe for removably coupling the pipe to the frame.

13. The assembly of claim 12, further including each coupler comprising a first section of the coupler coupled to and extending from the frame, the first section of the coupler being L-shaped such that a horizontal segment of the first section of the coupler is positioned for contacting a lower perimeter of the pipe as the pipe is lowered onto the frame and a vertical segment of the first section of the coupler is positioned for abutting the pipe for retaining the pipe on the horizontal segment.

14. The assembly of claim 13, further comprising:

a second section of the coupler coupled to and extending arcuately from the first section of the coupler distal from the frame; and a third section of the coupler coupled to and extending from the second section of the coupler distal from the first section of the coupler such that the third section of the coupler is parallel to the vertical segment of the first section of the coupler wherein the third rod, the second section of the coupler, and the vertical segment of the first section of the coupler define a hook configured for coupling to a chain for lifting the frame.

15. The assembly of claim 1, further including a pair of handles coupled to the pipe proximate to an upper perimeter of the pipe such that the handles are opposingly positioned on the pipe wherein each handle is configured for grasping in a respective hand of a user for lifting the pipe.

16. The assembly of claim 15, further including the pair of handles comprising a pair of rings, the rings being pivotally coupled to the pipe.

17. The assembly of claim 16, further including the rings being rectangularly shaped.

18. A modular forced air burner assembly comprising:

a frame having a top configured for supporting a pot, the top being open, the frame comprising a plurality of legs and a plurality of crossbars, each crossbar being coupled to and extending between upper ends of a respective pair of adjacently positioned legs such that the legs of the respective pair of adjacently positioned legs are positioned in parallel, the plurality of legs comprising three legs such that the frame is triangularly shaped when viewed from the top;

a burner assembly selectively positionable below the pot positioned on the top of the frame wherein the burner assembly is configured for burning a fuel gas for heating the pot and its contents, the burner assembly comprising:

a housing defining an interior space, the housing having an upper face, the upper face being open, a panel coupled to the housing and positioned in the interior space, the panel being V-shaped, the panel having an upper limit coupled to opposing sides of the housing proximate to the upper face, a plurality of holes positioned in the panel, a first tube coupled to and extending from the housing such that the first tube is in fluidic communication with the interior space, the first tube extending from a point proximate to a lower face of the housing, a second tube coupled to the first tube distal from the housing, the second tube being circumferentially larger than the first tube, a burner coupled to the housing and positioned in the interior space such that the burner is positioned above a lower limit of the panel, a hose coupled to the burner and extending from the housing, a connector coupled to the hose distal from the housing wherein the connector is configured for coupling the hose to a source of compressed fuel gas, the connector being configured for coupling to a propane tank, a valve positioned in the hose proximate to the connector such that the valve is configured for selectively closing the hose, an igniter coupled to the housing and positioned in the interior space proximate to the burner, and a switch selectively couplable to the frame, the switch being selectively operationally couplable to the igniter such that the switch is positioned for selectively actuating the igniter for lighting the fuel gas escaping from the burner;

a brace coupled to and extending between the legs of the plurality of legs, the brace being positioned proximate to a lower end of each leg such that the brace is positioned for rigidifying the frame and for positioning the burner assembly such that the burner assembly is positioned for heating the pot and its contents, the brace comprising a set of bars, the bars being mutually coupled defining a centerpoint of the brace, each bar extending to and being coupled to a respective leg;

a forced air module selectively operationally couplable to the burner assembly wherein the forced air module is configured for forcing air into the burner assembly for enhancing combustion of the fuel gas, the forced air module comprising:

a third tube selectively couplable to the first tube for fluidically coupling the third tube to the interior space, the third tube being circumferentially equivalent to the first tube such that the third tube is positioned for inserting into the second tube for fluidically coupling the third tube to the interior space, a stand coupled to the third tube distal from the first tube wherein the stand is configured for positioning on a horizontal surface such that the third tube is parallel to the horizontal surface, a blower coupled to the third tube distal from the first tube wherein the blower is configured for forcing air into the burner assembly for enhancing combustion of the fuel gas, and a power module operationally coupled to the blower such that the power module is positioned for powering the blower, the power module comprising a power cord wherein the power cord is configured for coupling to a source of electrical current for powering the blower;

a pipe selectively couplable to an exterior of the frame such that the pipe extends from a point proximate to a midpoint of the frame past the top of the frame wherein the pipe is configured for directing heat across a sidewall of the pot for enhancing heating of the pot and its contents;

a plurality of couplers coupled to the frame such that the couplers are positioned for selectively coupling to the pipe for removably coupling the pipe to the frame, each coupler comprising a first section of the coupler coupled to and extending from the frame, the first section of the coupler being L-shaped such that a horizontal segment of the first section of the coupler is positioned for contacting a lower perimeter of the pipe as the pipe is lowered onto the frame and a vertical segment of the first section of the coupler is positioned for abutting the pipe for retaining the pipe on the horizontal segment;

a second section of the coupler coupled to and extending arcuately from the first section of the coupler distal from the frame;

a third section of the coupler coupled to and extending from the second section of the coupler distal from the first section of the coupler such that the third section of the coupler is parallel to the vertical segment of the first section of the coupler wherein the third section of the coupler, the second section of the coupler, and the vertical segment of the first section of the coupler define a hook configured for coupling to a chain for lifting the frame; and a pair of handles coupled to the pipe proximate to an upper perimeter of the pipe such that the handles are opposingly positioned on the pipe wherein each handle is configured for grasping in a respective hand of a user for lifting the pipe, the pair of handles comprising a pair of rings, the rings being pivotally coupled to the pipe, the rings being rectangularly shaped.

\* \* \* \* \*